United States Patent [19]

Kuze

[11] 4,053,784

[45] Oct. 11, 1977

[54] PHOTO SEQUENCE PROGRAMMER

[76] Inventor: Yoshikazu Kuze, 31-3, Higashi Magome 1-chome, Ota, Tokyo, Japan

[21] Appl. No.: 638,148

[22] Filed: Dec. 5, 1975

[30] Foreign Application Priority Data

Dec. 7, 1974 Japan .................... 49-140116

[51] Int. Cl.² ............................................. G06K 7/10
[52] U.S. Cl. ................................. 250/570; 250/229; 250/237 R
[58] Field of Search ............... 250/570, 229, 237, 239; 318/480, 640

[56] References Cited

U.S. PATENT DOCUMENTS

| 3,286,096 | 11/1966 | Finlay | 250/229 |
| 3,307,041 | 2/1967 | Kling | 250/229 |
| 3,622,793 | 11/1971 | Dalton et al. | 250/570 |
| 3,749,921 | 7/1973 | Vital et al. | 250/229 |
| 3,921,048 | 11/1975 | Padgitt | 318/480 |

Primary Examiner—David C. Nelms
Attorney, Agent, or Firm—James E. Nilles

[57] ABSTRACT

A photo sequence programmer provides the structure that multiple light-emitting elements are disposed inside a rotary transparent cylinder and multiple light-receiving elements are disposed outside the said cylinder. Adhesive opaque tapes are attached on the surface of the transparent cylinder in accordance with a predetermined time chart so that the revolution of the transparent cylinder causes multiple photo-electric conversion switching circuits, which consist of the said light-emitting elements and light-receiving elements, to turn ON and OFF.

15 Claims, 18 Drawing Figures

PHOTO SEQUENCE PROGRAMMER

This invention relates to the photo sequence programmer, particularly for use in automatic control of machines.

The present invention provides the structure that multiple light-emitting elements are disposed inside a rotary transparent cylinder and multiple light-receiving elements are disposed outside the said cylinder so that a couple of light-emitting element and light-receiving element accurately may face each other with the said transparent cylinder wall between them.

The adhesive opaque tape is attached in parallel on the surface of the transparent cylinder in accordance with a predetermined time chart so that the revolution of the transparent cylinder causes multiple photo-electric conversion switching circuits which consist of the said light-emitting elements and light-receiving elements, to turn ON and OFF. Each switching circuit includes a load control element in the form of a triac or a relay which is connected in series with the load which it controls or energization from the AC power supply.

In the present invention, each adhesive opaque tape is cut in each length according to a program time chart, and attached in parallel onto the surface of the transparent cylinder, hence, this makes it extremely easy to program a sequence control and change the program.

The object of the present invention is to present a photo sequence programmer providing a simplified programming, a simplified changing of program, simple construction, compact size with a result of the said programmer to be produced very economically.

Another object of the present invention is to present a photo sequence programmer which can be stopped at the end of its one rotation for synchronization with driving cycle of machines to be controlled.

These and other objects, features, and advantages of the present invention will be readily apparent from the following description and appended claims taken in conjunction with the accompanying drawings wherein;

Figure 1:
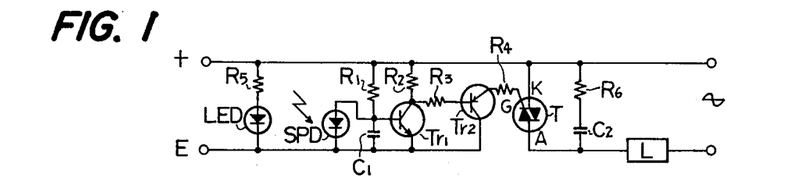
FIG. 1 is a photo-electric conversion switching circuit using silicon photo diode.

Referring now to FIG. 1, there is shown a typical photo-electric conversion switching circuit for the photo sequence programmer of the present invention.

Light-emitting diode LED and silicon photo diode SPD are secured to face with each other so that light emitted from LED is projected to SPD. Anode of SPD is connected to base of NPN transistor $Tr_1$ while cathode thereof is grounded, a point intermediate base and anode is connected positive DC source through resistor $R_1$ and also is grounded through capacitor $C_1$. Collector of transistor $Tr_1$ is connected to positive DC source through resistor $R_2$ and also to base of PNP transistor $Tr_2$ through resistor $R_3$ and emitter of transistor $Tr_2$ is connected to gate G of triac T through resistor $R_4$, while collector of transistor $Tr_2$ is grounded together with emitter of transistor $Tr_1$. Triac T is connected in series with load L across AC terminals.

The operation of the circuit is such that when light from LED is projected to SPD a voltage is created between anode and cathode of SPD. Then, transistor $Tr_1$ is reverse biased and therefore $Tr_1$ turns OFF and its collector voltage increases up to the positive source. Therefore no base current flows through transistor $Tr_2$ which then turns OFF, and triac is put to its OFF state.

Next, when light from LED is intercepted, voltage between anode and cathode of SPD disappears, whereupon a base current is fed to $Tr_1$ through resistor $R_1$. Consequently, $Tr_1$ turns ON, and the collector voltage thereof becomes substantially zero. Transistor $Tr_2$ turns ON, and triac T is put to its ON state, thereby a full line AC voltage is applied across load L.

Thus control of AC power supply coupling to load L across triac T is achieved by the way that light of LED is intercepted or not.

Resistors $R_1$ and $R_3$ are provided to limit a base current of $Tr_1$ and $Tr_2$, resistor $R_4$ is to limit a triggering current to gate G of triac T. Capacitor $C_1$ is for noise absorption, a series circuit of resistor $R_6$ and capacitor $C_2$ are used for inductive load and resistor $R_5$ is provided to limit the current to LED.

Figure 2:
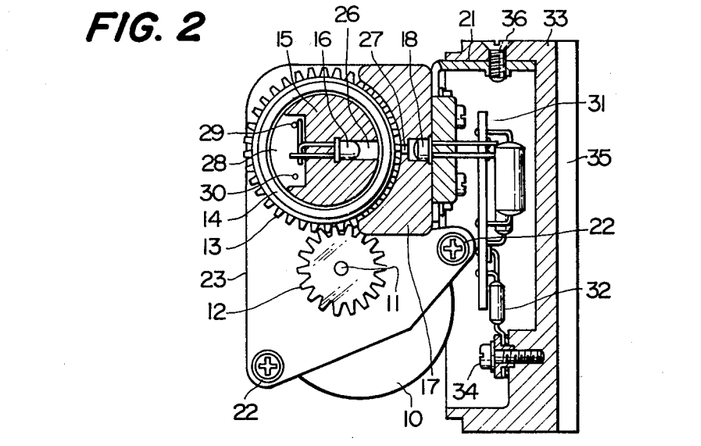
FIG. 2 shows a transverse cross-sectional view of the assemble of the photo sequence programmer.
Figure 9:
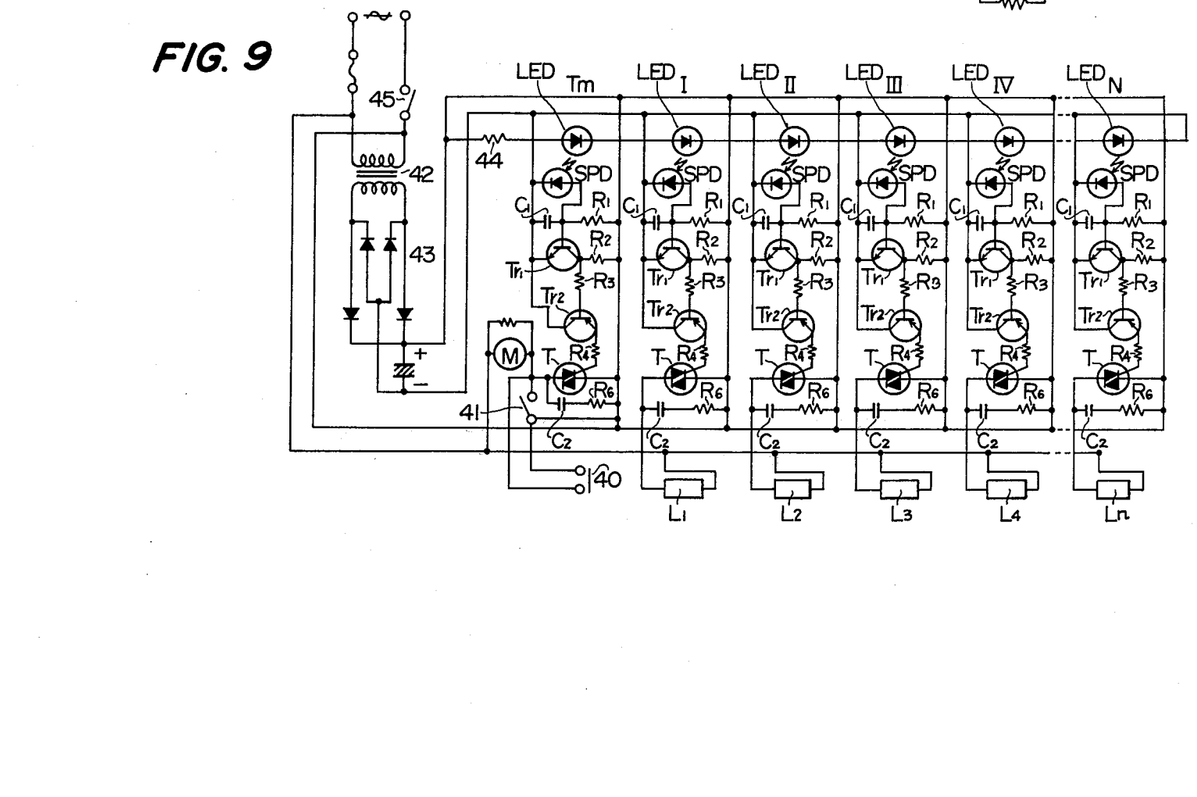
FIG. 9 is a circuit of triac-SPED type of the photo sequence programmer.

In FIG. 2, a timing motor 10 is provided with output pin 11 to which pinion 12 is fitted. Gear 13 engages with pinion 12 and is secured at one end of transparent cylinder 14 (FIG. 3), which is mounted onto stationary shaft 15 made of electrically insulating material and incorporating therein multiple light-emitting diodes 16 aligned in series with each other (FIG. 3, FIG. 9).

Figure 4:
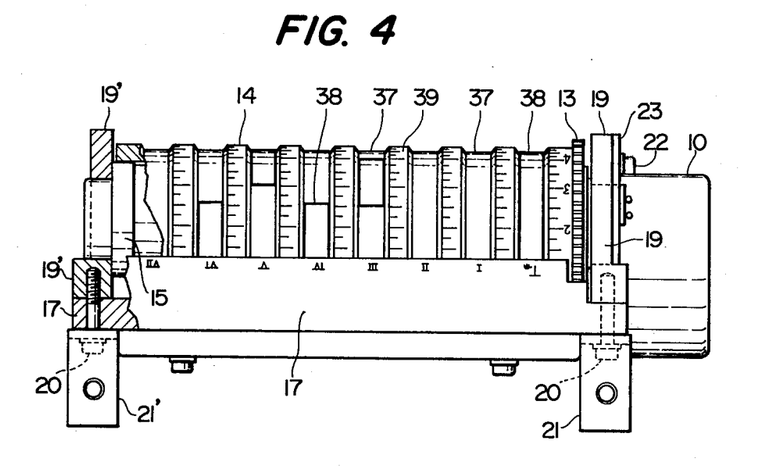
FIG. 4 shows a top view of the photo sequence programmer.
Figure 5:
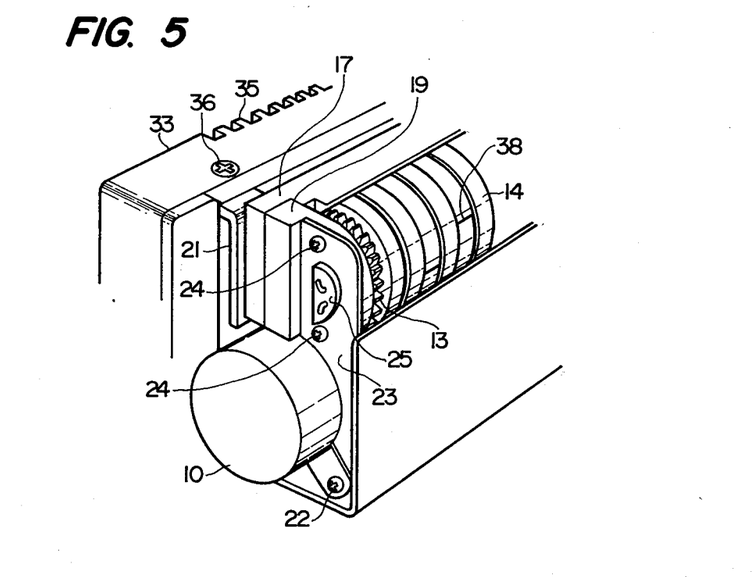
FIG. 5 shows a partial elevational view of the photo sequence programmer.

Light-receiving disc or member 17 is made of electrically insulating material and incorporates therein multiple silicon photo diodes (SPD) 18. Both ends of stationary shaft 15 are fitted into holes of connection disc 19 and 19' while light-receiving disc 17 is secured to connection disc 19 and 19' by screws 20 together with frames 21 and 21' (FIG. 4).

Figure 3:
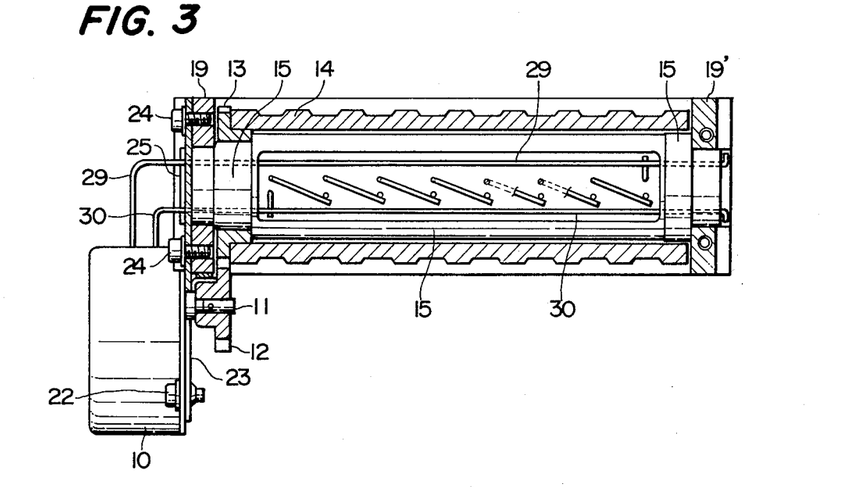
FIG. 3 shows a front view of longitudinal partial cross-section of the photo sequence programmer.
Figure 6:
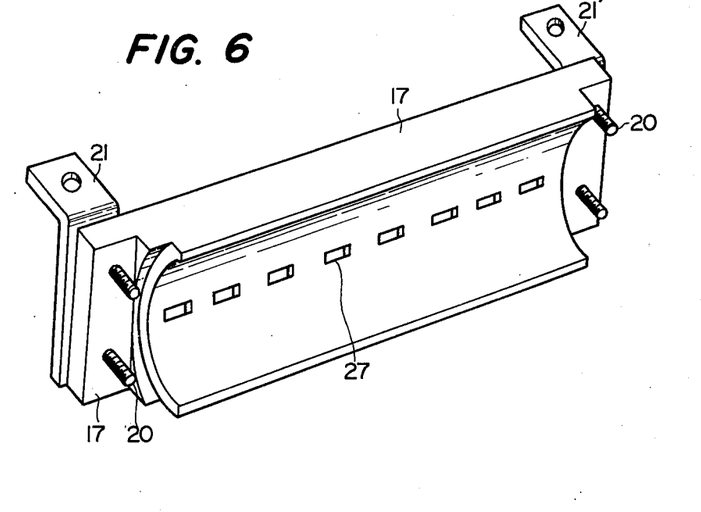
FIG. 6 shows an elevational view of a light-receiving disc.

Timing motor 10 is secured by screw 22 to plate 23 which is secured to one of connection discs by screws 24 (FIG. 3). In order for light-emitting diode 16 to be faced correctly to silicon photo diode 18, end 25 of stationary shaft 15 is formed in a half-circle shape and fitted into half-circle hole of plate 23 corresponding to the half-circle shape of stationary shaft 15 (FIG. 6).

Each light-emitting diodes 16 is incorporated in hole 26 in stationary shaft 15, so that light therefrom is effectively projected onto each silicon photo diode 18 aligned inside light-receiving disc 17 through slit 27. On the opposite side of hole 26, there is provided a cavity 28 for wiring. Lead wires 29 and 30 pass through stationary light-emitting shaft 15 and one end of each lead wire is bent and secured in tension and connected to leads of a group of light-emitting diodes in series with each other (FIG. 3).

Light-receiving disc 17 is placed adjacent to transparent cylinder 14. If required, disc 17 may be formed in such a shape as to cover transparent cylinder 14 in order to eliminate any loss in effective incident rays (FIG. 6).

Designated 31 indicates a printed circuit board to which are connected each element of photo-electric conversion switching circuit illustrated in FIG. 1, resistors, capacitors, transistors and the like. Triac 32 is mounted onto base 33 by screws 34 insulated electrically. Designated 35 denotes a cooling fin. Thus, main mechanism of photo sequence programmer of the present invention is secured to a base 33 by screws 36.

Multiple grooves 37 are provided in parallel on transparent cylinder 14 in match with width of adhesive opaque tape 38 (FIG. 4), and scales 39 are provided in equal space. Outside diameter of grooves are determined so that outer circumference of opaque tape attached thereto becomes exactly 100 mm. If thickness of tape is 0.25 mm, for example, the outside diameter of grooves are set to 31.3 mm consequently.

That is to say, the time required for every cycle of the sequence programming is 100 mm which denotes one revolution of transparent cylinder 14.

Adhesive opaque tape is cut in each length of each step of resulting time chart and attached onto grooves in match scales of transparent cylinder according to the time chart.

Figure 7:
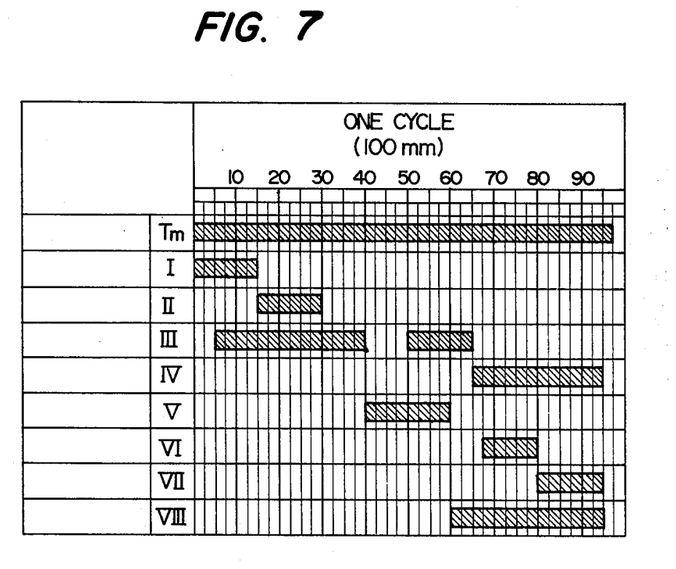
FIG. 7 is a program time chart.

FIG. 7 illustrates an example of time chart. When transparent cylinder 14 is actuated for revolution by timing motor 10 and opaque tape attached thereto intercepts light from light-emitting diode 16, no light is projected onto silicon photo diode 18 whereby triac T is put to its ON state. On the contrary, when opaque tape does not intercept, light is projected to silicon photo diode 18 and triac T is put to its OFF state.

In this manner, each load is controlled to repeat ON and OFF in accordance with the presence or absence of opaque tape on transparent cylinder dependent on time chart.

The photo sequence programmer of the present invention presents a simple procedure of cutting and attaching opaque tape onto transparent cylinder, hence, programming as well as modification thereof for any sequence control are extremely simple and easy.

Figure 8:
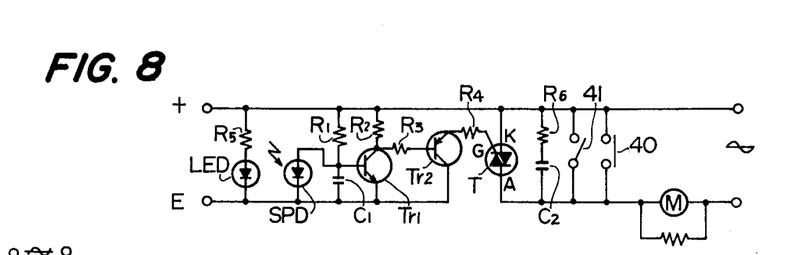
FIG. 8 is a timing motor driving circuit using silicon photo diode.

FIG. 8 illustrates a timing motor driving circuit. This circuit employs a triac-SPD photo-electric conversion switching circuit which is explained in FIG. 1. As opaque tape attached throughout the entire circumference of groove of transparent cylinder leaving only a small margin, the transparent cylinder is put to a stop at the end of its one revolution. When normally open switch 40 turns ON, transparent cylinder restarts revolution, and it makes continuous revolution when change over switch 41 is turned ON. When it is desired to stop cylinder every rotation, change over switch 41 is put to its OFF state.

FIG. 9 is a circuit diagram of triac-SPD type photo sequence programmer. This circuit consists of a timing motor driving circuit Tm and a number of the triac-SPD photo-electric conversion switching circuits. DC control circuits of Tm, I, II, III, IV, ... N are connected in parallel between ground and DC power supply which is obtained from AC power supply through transformer 42 and rectifier circuit 43. Each of light-emitting diodes LED are connected to positive DC source in series through resistor 44. On the other hand, triac circuits of Tm, I, II, III, IV, ... N are connected in paralle to AC power supply across load M, $L_1$, $L_2$, $L_3$, $L_4$, ... Ln.

When switch 45 is turned ON, all light-emitting diodes LED start emitting light. When there are no opaque tape between LED and SPD, triacs T are turned OFF thereby feeding no current to load. When switch 41 is turned ON, timing motor M drives transparent cylinder 14.

When opaque tapes attached onto transparent cylinder interrupt light from light-emitting LED, triacs are turned ON and thereby loads are turned ON, and put under the sequence control in accordance with time chart.

Figure 10:
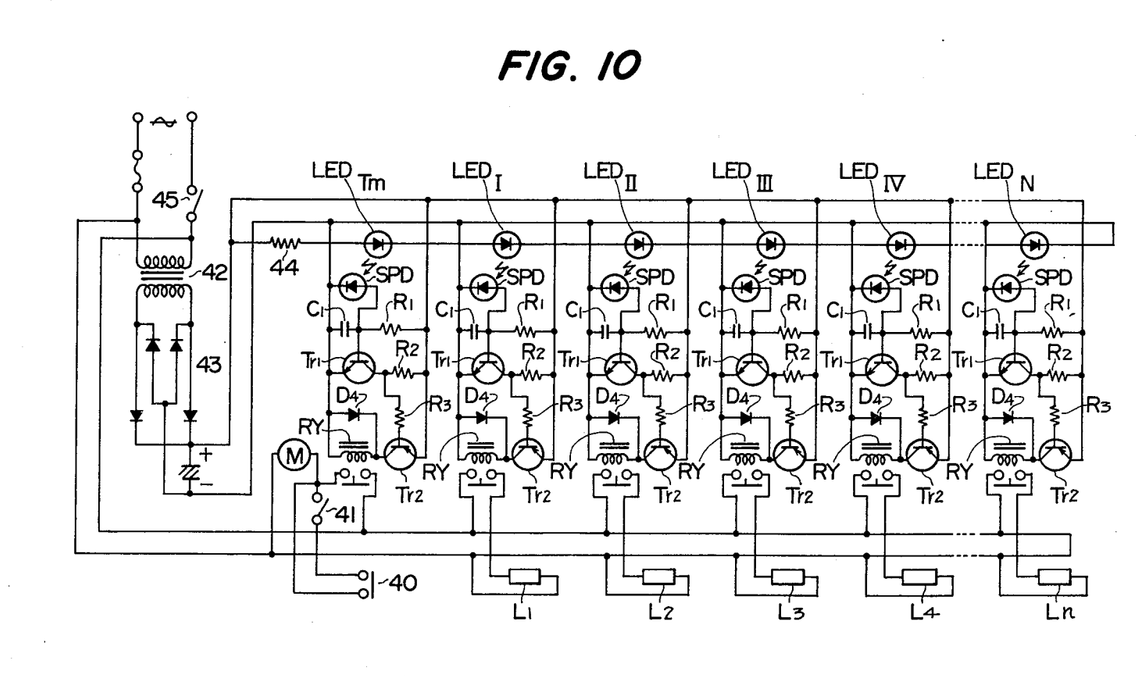
FIG. 10 is a circuit of relay-SPED type of the photo sequence programmer.

FIG. 10 illustrates a relay-SPD type photo sequence programmer which is obtained by replacing triac with relay. As will be aparent from the explanation in FIG. 9, explanation is deleted on FIG. 10.

Figures 11, 12, 13:
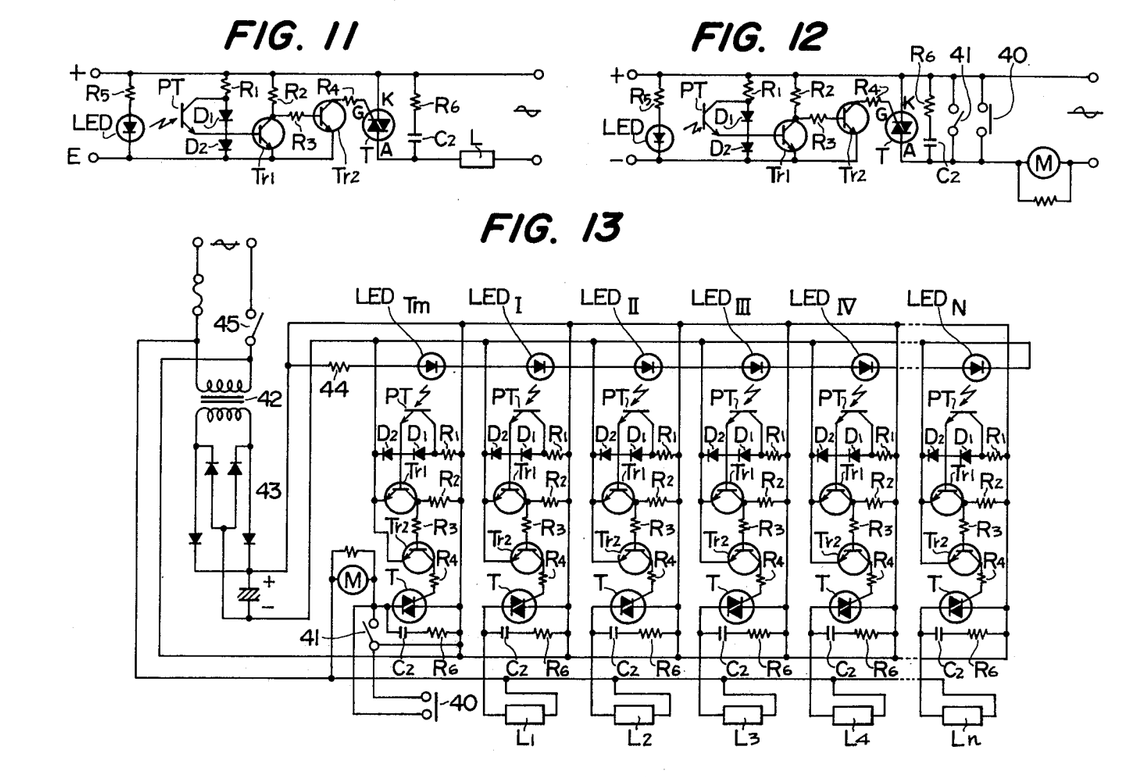
FIG. 11 is a photo-electric conversion switching circuit using photo-transistor.
FIG. 12 is a timing motor driving circuit using photo-transistor.
FIG. 13 is a circuit of triac-photo-transistor type of the photo sequence programmer.

FIG. 11 illustrates a triac-photo-transistor type photo-electric conversion switching circuit. In this circuit, emitter of photo-transistor PT is connected to positive DC source through resistor $R_1$ and is connected to ground through a series circuit of diodes $D_1$ and $D_2$. Collector of $Tr_1$ is connected to DC power supply through resistor $R_2$, also to base of transistor $Tr_2$ through resistor $R_3$. Further, collector of transistor $Tr_2$ is connected to gate of triac T through resistor $R_4$. Triac T is connected in series with load L across AC terminals.

When light of LED is projected to photo-transistor PT, an emitter current is impressed thereof, and the said emitter current is then sent to $Tr_1$ as the base current rendering it to turn ON. Therefore transistor $Tr_2$ turns OFF and triac T consequently turns OFF, thereby feeding no current to load L. When light of LED is intercepted from photo-transistor PT by opaque tape attached onto transparent cylinder, emitter current of photo-transistor PT becomes substantially zero so that transistor $Tr_1$ turns OFF. Therefore transistor $Tr_2$ turns ON and triac T consequently turns ON and feeds a current to load L. Resistor $R_1$ limit the current passing through $D_1$ and $D_2$. A part of the current is sent to $Tr_1$ as the base current. Resistor $R_3$ limits the gate current of triac.

FIG. 12 illustrates a photo-transistor timing motor driving circuit.

FIG. 13 illustrates a circuit diagram of a photo-transistor-SPD type photo sequence programmer, which consists of a timing motor driving circuit Tm and a number of photo-transistor-SPD type photo-electric conversion switching circuits.

Figures 14, 15, 16:
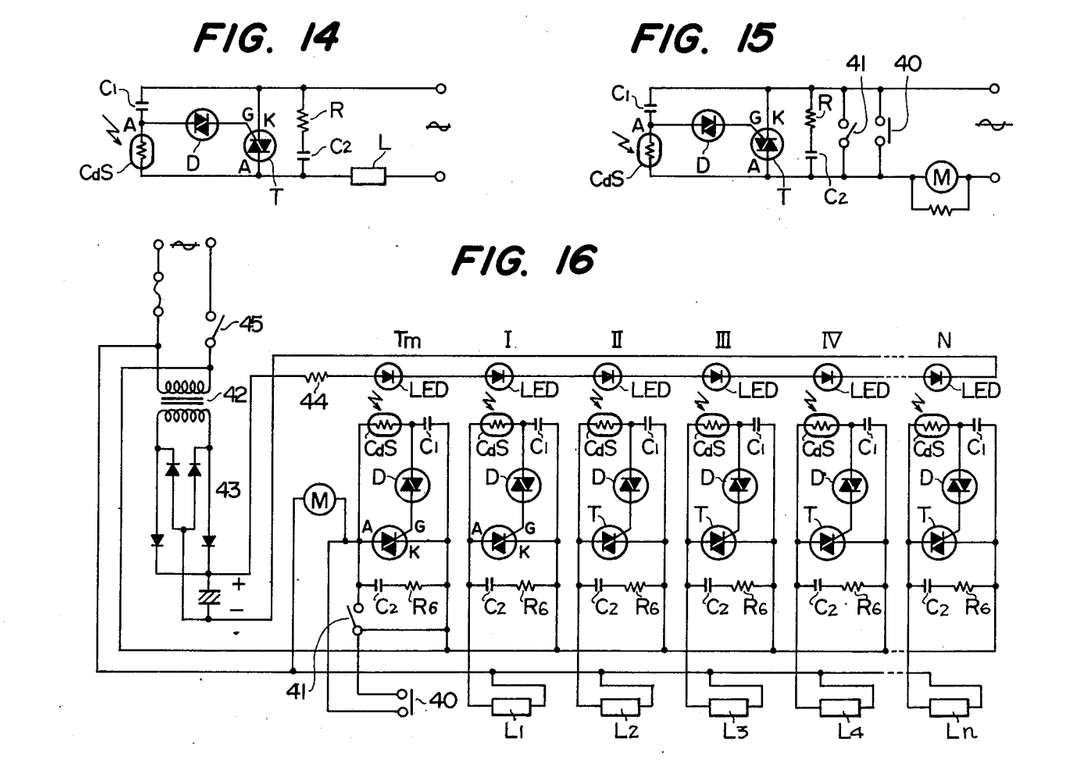
FIG. 14 is a photo-electric conversion switching circuit using CdS.
FIG. 15 is a timing motor driving circuit using CdS.
FIG. 16 is a circuit of triac-CdS type of photo sequence programmer.

FIG. 14 illustrates a circuit of a CdS photo-electric conversion switching circuit. As shown, the series circuit of CdS and capacitor $C_1$ is connected in shunt to AC power supply, and the point A intermediate CdS and capacitor $C_1$ is connected to gate of triac through a triggering diode (diac) D. Resistance of CdS becomes smaller when light of LED is projected thereto and the resistance becomes remarkably larger when light is intercepted. When light from light-emitting diode is intercepted by opaque tape attached onto transparent cylinder, the voltage at the point A becomes larger than the break-over voltage of diac D, whereupon diac becomes conductive, thus triac turns ON to permit current flow to load L. When light from LED is projected onto CdS, on the other hand, the resistance of CdS becomes smaller than the break-over voltage of diac D, whereupon diac turns OFF thereby feeding no current to load L.

FIG. 15 illustrates a CdS timing motor driving circuit.

FIG. 16 illustrates a circuit of CdS photo sequence programmer consisting a CdS timing motor driving circuit and a number of CdS photo-electric conversion switching circuits.

In practice, the sequence cycle of the photo sequence programmer must be in perfect synchronization with the driving cycle of a machine to be controlled. In accordance with the present invention, the photo sequence programmer can be brought into synchronization by means of connection of a timing motor driving circuit to output of any sensor.

Figure 17:
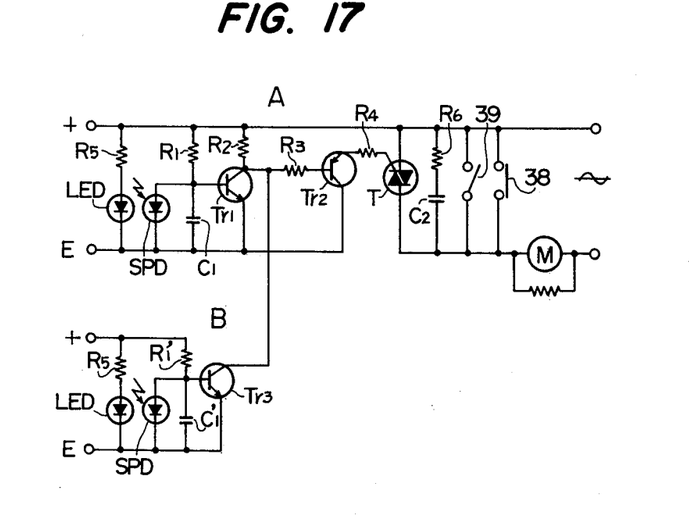
FIG. 17 is an embodiment of a triac-SPD synchronous timing driving circuit.

FIG. 17 illustrates one embodiment of a triac-SPD timing synchronous driving circuit using photo sensor. The photo sensor is attached to the machine actuated by a light-intercepting piece fitted to a driving article which rotates once per cycle of the machine motion.

Figure 18:
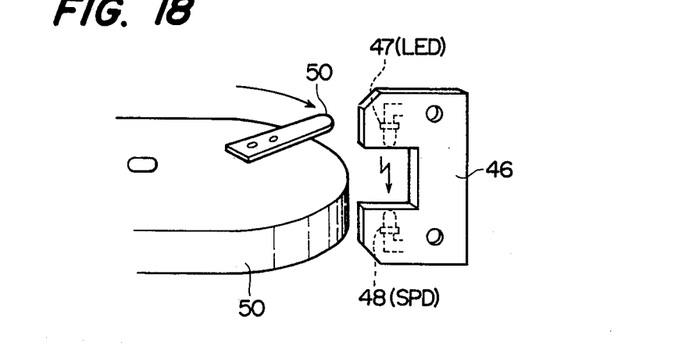
FIG. 18 shows a photo sensor to get fixed on the side of a machine for synchronization with the said machine.

In FIG. 18 photo sensor 46, light-emitting diode 47 and silicon photo diode 48 are positioned to face with each other. Driving article 49 rotates once per cycle of the machine motion and light-intercepting piece 50 is fitted thereto.

As can be appreciated clearly from FIG. 17, collector of transistor $Tr_1$ of circuit A of a triac-SPD timing motor driving circuit is connected to collector of transistor $Tr_3$ of photo sensor circuit B.

As opaque tape for timing motor is attached transparent cylinder stops at the end of every rotation, timing motor keeps running while the opaque tape intercepts light from light-emitting diodes LED but when opaque tape becomes absent at the end of every rotation light from LED is projected to silicon photo diode SPD thereby transistor $Tr_1$ is reverse biased and timing motor comes to a stop. In this instance, light-emitting diode LED of photo sensor 46 adapted to the machine is intercepted by light intercepting piece 50, then transistor $Tr_3$ turns ON. Therefore transistor $Tr_2$ turns ON to permit motor M to restart rotation.

If the time required for one revolution of transparent cylinder is arranged in advance to be made a little shorter than the time required for one cycle of the machine, it is ensured that the machine can always be actuated by photo sensor only after transparent cylinder stops its rotation. Thus, the sequence cycle of the photo sequence programmer is brought into synchronization with the driving cycle of the machine.

The present invention involves the use of photo sensor or any other equivalent sensor such as proximity switches, non conducting switches, so on.

What is claimed is:
1. A photo sequence programmer comprising:
   a rotary transparent cylinder;
   a plurality of light-emitting elements disposed inside said cylinder;
   a plurality of light-receiving elements disposed outside said cylinder, each light-emitting element facing a light-receiving element through said transparent cylinder between them;
   opaque tapes attached on the surface of said cylinder in accordance with a predetermined arrangement to effect interruption of light being transmitted from said light-emitting elements to said light-receiving elements in a predetermined sequence as said cylinder rotates;
   and a plurality of switching circuits including said plurality of light-emitting elements and said plurality of light-receiving elements, said switching circuits being actuatable in response to said interruption of light.

2. A photo sequence programmer according to claim 1 and including:
   an AC power supply;
   a DC power supply energized from said AC power supply;
   a timing motor energizable from said AC power supply and connected to rotate said cylinder;
   a timing motor driving circuit;
   a plurality of loads, each load being controlled by one of said switching circuits;
   and a plurality of load control elements;
   and wherein each of said switching circuits includes:
   a DC control circuit including one of said light-emitting elements and one of said light-receiving elements, each DC control circuit being connected for energization from said DC source;
   and a load circuit responsive to one of said DC control circuits and including one of said loads connected in series with one of said load control elements for energization from said AC source.

3. A photo sequence programmer according to claim 2 wherein said load control element is a triac.

4. A photo sequence programmer according to claim 2 wherein said load control element is a relay.

5. A photo sequence programmer according to claim 2 wherein said light-emitting element is a light-emitting diode and said light-receiving element is a silicon photo diode.

6. A photo sequence programmer according to claim 2 wherein said light-emitting element is a light-emitting diode and said light-receiving element is a photo transistor.

7. A photo sequence programmer according to claim 5 wherein said light-emitting element is a light-emitting diode and said light-receiving element is a cadmium sulfide photo electric device.

8. A photo sequence programmer according to claim 2 wherein said timing motor driving circuit comprises a photo-electric conversion switching circuit which is connected to the output of a sensor responsive to the position of a machine controlled by said programmer so that said timing motor driving circuit is in synchronization with the driving cycle of the machine.

9. A photo sequence programmer according to claim 5 wherein each said light-emitting diode and each said silicon photo diode are mounted so as to face each other, wherein the anode of each silicon photo diode is connected to the base of an NPN transistor and the cathode thereof is grounded, wherein a point intermediate said base and said anode is connected to said positive side of said DC source through a resistor and also is grounded through a capacitor, wherein a collector of said NPN transistor is connected to said positive side of said DC source through a resistor and also to the base of a PNP transistor through a resistor, and wherein the emitter of said PNP transistor is connected to the gate of said triac through a resistor and the collector of said PNP transistor is grounded together with the emitter of said NPN transistor, and wherein said triac is connected in series with said load across said AC source.

10. A photo sequence programmer comprising:
a stationary shaft having a plurality of light-emitting elements therein;
a transparent cylinder rotatably mounted on said shaft;
a stationary light-receiving member disposed outside said cylinder having a plurality of light-receiving elements therein, each light-emitting element facing a light-receiving element through said transparent cylinder between them;
and a pair of connection discs, each connection disc being rigidly connected to an end of said stationary shaft and rigidly connected to a corresponding end of said stationary light-receiving member.

11. A photo sequence programmer according to claim 10 wherein said cylinder has a plurality of circumferential grooves on the surface thereof; scales on said cylinder surface and opaque tapes of predetermined length in at least some of said grooves.

12. A photo sequence programmer according to claim 10 wherein said stationary shaft is provided with a plurality of said light-emitting elements which are disposed in holes aligned along the longitudinal axis of said shaft, and each hole having at the opposite sides thereof a cavity for wiring.

13. A photo sequence programmer according to claim 10 wherein said light-receiving member is provided with a plurality of light-receiving elements which are disposed in holes aligned in spaced relationship with each other in said light-receiving member, each hole being provided with a slit for light to pass through and said slit formed in such a shape to eliminate loss in effective incident light radiation.

14. A photo sequence programmer according to claim 10 including opaque tapes attached on the surface of said cylinder in accordance with a predetermined arrangement to effect interruption of light being transmitted from said light-emitting elements to said light-receiving elements in a predetermined sequence as said cylinder rotates;
and a plurality of switching circuits including said plurality of light-emitting elements and said plurality of light-receiving elements, said switching circuits being actuatable in response to said interruption of light.

15. A photo sequence programmer according to claim 14 including a timing motor driving device for driving said cylinder and wherein one of said opaque tapes is attached on the surface of said cylinder around the entire circumference thereof leaving a margin so as to effect stopping of said cylinder at the end of one revolution.

* * * * *